(12) United States Patent
Kemery (10) Patent No.: US 8,751,329 B2
(45) Date of Patent: Jun. 10, 2014

(54) LICENSED CONTENT PURCHASING AND DELIVERING

(75) Inventor: Michael Kemery, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 12/544,464

(22) Filed: Aug. 20, 2009

(65) Prior Publication Data

US 2011/0047041 A1 Feb. 24, 2011

(51) Int. Cl.
*G06Q 30/00* (2012.01)

(52) U.S. Cl.
USPC .............................. 705/26.5; 705/51; 705/59

(58) Field of Classification Search
USPC .................. 705/51–59, 26–27.2; 725/86–153
See application file for complete search history.

(56) References Cited

U.S. PATENT DOCUMENTS

| | | | |
|---|---|---|---|
| 5,023,907 A * | 6/1991 | Johnson et al. | 710/200 |
| 6,767,212 B2 | 7/2004 | Thomas | |
| 6,889,212 B1 | 5/2005 | Wang et al. | |
| 7,046,139 B2 | 5/2006 | Kuhn et al. | |
| 7,113,981 B2 | 9/2006 | Slate | |
| 7,218,912 B2 | 5/2007 | Erskine et al. | |
| 7,302,272 B2 | 11/2007 | Ackley | |
| 7,415,711 B2 | 8/2008 | Chew et al. | |
| 2001/0018660 A1 | 8/2001 | Sehr | |
| 2002/0156792 A1 | 10/2002 | Gombocz et al. | |
| 2003/0078036 A1 | 4/2003 | Chang et al. | |
| 2004/0166878 A1 | 8/2004 | Erskine et al. | |
| 2004/0180648 A1 | 9/2004 | Hymel et al. | |
| 2004/0235520 A1 | 11/2004 | Cadiz et al. | |
| 2005/0096009 A1 | 5/2005 | Ackley | |
| 2005/0125819 A1 | 6/2005 | Ono et al. | |
| 2005/0278637 A1 | 12/2005 | Youm et al. | |
| 2006/0101499 A1 | 5/2006 | Aravamudan et al. | |
| 2006/0121428 A1 | 6/2006 | Terrazas | |
| 2006/0122938 A1* | 6/2006 | Hicks et al. | 705/59 |
| 2006/0143047 A1 | 6/2006 | Briegs et al. | |
| 2006/0143622 A1 | 6/2006 | Prabandham et al. | |
| 2006/0189348 A1 | 8/2006 | Montulli et al. | |
| 2006/0194181 A1 | 8/2006 | Rosenberg | |
| 2006/0224943 A1 | 10/2006 | Snyder et al. | |
| 2006/0242242 A1 | 10/2006 | Ezumi et al. | |
| 2006/0255119 A1 | 11/2006 | Marchasin et al. | |
| 2006/0258341 A1 | 11/2006 | Miller et al. | |
| 2006/0270395 A1 | 11/2006 | Dhawan et al. | |
| 2007/0006327 A1* | 1/2007 | Lal et al. | 726/31 |

(Continued)

FOREIGN PATENT DOCUMENTS

| KR | 20010096407 | 11/2001 |
|---|---|---|
| KR | 20020066804 | 8/2002 |

(Continued)

OTHER PUBLICATIONS www.oomble.com Aug 22, 2007 [recovered from www.Archive.org].*

(Continued)

*Primary Examiner* — William Allen (74) *Attorney, Agent, or Firm* — Lee & Hayes, PLLC (57) ABSTRACT

A content server enables one user to purchase licensed content for another user and, in response to the purchase, automatically delivers the content to the other user's device. The content server further configures the other user's device to receive and utilize the licensed content, thus enabling the other user to consume the content.

19 Claims, 5 Drawing Sheets

(56) References Cited

U.S. PATENT DOCUMENTS

| | | | |
|---|---|---|---|
| 2007/0021145 A1 | 1/2007 | Lam | |
| 2007/0037562 A1 | 2/2007 | Smith-Kerker et al. | |
| 2007/0037563 A1 | 2/2007 | Yang et al. | |
| 2007/0039025 A1 | 2/2007 | Kraft et al. | |
| 2007/0058637 A1 | 3/2007 | Lo | |
| 2007/0070404 A1* | 3/2007 | Caradec et al. | 358/1.15 |
| 2007/0081075 A1 | 4/2007 | Canova, Jr. et al. | |
| 2007/0099609 A1 | 5/2007 | Cai | |
| 2007/0127633 A1 | 6/2007 | Hertel et al. | |
| 2007/0198413 A1* | 8/2007 | Nagao | 705/50 |
| 2007/0250382 A1 | 10/2007 | Beck | |
| 2008/0064381 A1 | 3/2008 | Ackley | |
| 2008/0070608 A1 | 3/2008 | Ackley | |
| 2008/0070609 A1 | 3/2008 | Ackley | |
| 2008/0096544 A1 | 4/2008 | McNamara et al. | |
| 2008/0096603 A1 | 4/2008 | Sparre | |
| 2008/0140433 A1* | 6/2008 | Levy et al. | 705/1 |
| 2008/0162305 A1* | 7/2008 | Rousso et al. | 705/27 |
| 2008/0181201 A1 | 7/2008 | Park et al. | |
| 2008/0209577 A1* | 8/2008 | Vrielink et al. | 726/29 |
| 2008/0215494 A1* | 9/2008 | Corbett | 705/80 |
| 2008/0233944 A1 | 9/2008 | Tu | |
| 2008/0246605 A1 | 10/2008 | Pfeffer et al. | |
| 2008/0256641 A1 | 10/2008 | Lo | |
| 2008/0288966 A1 | 11/2008 | Maes | |
| 2008/0299527 A1 | 12/2008 | Groot et al. | |
| 2008/0307324 A1 | 12/2008 | Westen et al. | |
| 2009/0005000 A1 | 1/2009 | Baker et al. | |
| 2009/0006116 A1 | 1/2009 | Baker et al. | |
| 2009/0006200 A1 | 1/2009 | Baker et al. | |
| 2009/0015653 A1 | 1/2009 | Baek | |
| 2009/0018963 A1 | 1/2009 | Abu-Amara | |
| 2009/0038005 A1 | 2/2009 | Howarth | |
| 2009/0054092 A1 | 2/2009 | Stonefield et al. | |
| 2009/0069084 A1* | 3/2009 | Reece et al. | 463/32 |
| 2009/0106110 A1 | 4/2009 | Stannard et al. | |
| 2009/0143007 A1 | 6/2009 | Terlizzi | |
| 2009/0148824 A1 | 6/2009 | Argott | |
| 2009/0149205 A1 | 6/2009 | Heredia et al. | |
| 2009/0199178 A1 | 8/2009 | Keller et al. | |
| 2009/0209240 A1 | 8/2009 | Mahowald | |
| 2009/0225788 A1 | 9/2009 | Kephart et al. | |
| 2009/0254656 A1 | 10/2009 | Vignisson et al. | |
| 2009/0282005 A1 | 11/2009 | Kim et al. | |
| 2009/0317778 A1 | 12/2009 | Oberman | |
| 2010/0039254 A1 | 2/2010 | Cooper et al. | |
| 2010/0122170 A1 | 5/2010 | Girsch et al. | |
| 2010/0235476 A1* | 9/2010 | Lin et al. | 709/219 |
| 2010/0241530 A1 | 9/2010 | Murset | |
| 2010/0299712 A1* | 11/2010 | Austin et al. | 725/81 |
| 2010/0322234 A1 | 12/2010 | Kodaka | |
| 2011/0065419 A1 | 3/2011 | Book et al. | |
| 2011/0202863 A1 | 8/2011 | Corrallo | |
| 2012/0066088 A1 | 3/2012 | Murset | |

FOREIGN PATENT DOCUMENTS

| | | |
|---|---|---|
| KR | 20060108093 A | 10/2006 |
| KR | 20070005163 A | 1/2007 |
| KR | 20070017229 A | 2/2007 |
| WO | WO2010008509 A2 | 1/2010 |

OTHER PUBLICATIONS

Bick, "An Allowance That's Measured in Minutes, Not Cents," retrieved at <<http://www.nytimes.com/2007/11/25/business/yourmoney/25allowance.html?_r=2&pagewanted=print>>, Nov. 25, 2007, 3 pgs.

"My Reward Board," retrieved at <<http://www.myrewardboard.com/>> on Mar. 24, 2010, available as early as Jan. 25, 2010, 1 pg.

Raffle, et al., "Family Story Play: Reading with Young Children (and Elmo) Over a Distance", CHI 2010, Apr. 10-15, 2010, Atlanta, Georgia, 10 pages.

Yarosh et al., "Developing a Media Space for Remote Synchronous Parent-Child Interaction", IDC 2009, Jun. 3-5, 2009, Como, Italy, 10 pages.

"AT&T Video Share Lets Wireless Customers Share Live Video", retrieved from <<http://www.att.com/gen/press-room?pid=9199>>, on Feb. 26, 2009, 2 pages.

"Back to MediaCast FAQ", retrieved from <<http://vumenow.com/support_mediashare.php?faq=1>>, on Feb. 26, 2009, 2 pages.

"Cingular to roll out video/chat service", The Seattle Times: Tech Tracks, retrieved from <<http://blog.seattletimes.nwsource.com/techtracks/archives/2006/06/cingular_to_roll_out_videochat_service_1.html>>, Jun. 28, 2006, 2 pages.

GSM Association, "Image Share Interoperability Specification 1.1", Official Document IR.79, Apr. 10, 2008, 13 pages.

GSM Association, "Video Share Interoperability Specification 1.3", Official Document IR.74, Oct. 30, 2008, 18 pages.

PCT International Search Report and Written Opinion mailed Mar. 29, 2011 for PCT Application No. PCT/US2010/045991.

PCT International Search Report and Written Opinion mailed Apr. 15, 2011 for PCT Application No. PCT/US2010/045722.

Office Action for U.S. Appl. No. 12/544,881, mailed on Apr. 11, 2012, Kemery, "Parent Telecommunication Device Configuration of Activity-Based Child Telecommunication Device", 17 pages.

Non-Final Office Action for U.S. Appl. No. 12/731,717, mailed on Feb. 16, 2012, Winston Wang et al, "Shared Book Reading", 25 pages.

Non-Final Office Action for U.S. Appl. No. 12/732,103, mailed on Apr. 11, 2012, Marianna Wickman, et al., "Parent-Controlled Episodic Content on a Child Telecommunication Device", 10 pages.

Non-Final Office Action for U.S. Appl. No. 12/544,404, mailed on Apr. 26, 2012, Winston Wang et al, "Shareable Applications on Telecommunications Devices", 10 pages.

The PCT Search Report & Written Opinion mailed Oct. 27, 2011 for PCT Application No. PCT/US11/28527, 11 pages.

The PCT Search Report & Written Opinion mailed Oct. 31, 2011 for PCT Application No. PCT/US11/28545, 8 pages.

The PCT Search Report & Written Opinion mailed Nov. 30, 2011 for PCT Application No. PCT/US11/28371, 10 pages.

Final Office Action for U.S. Appl. No. 12/731,717, mailed on Aug. 16, 2012, Winston Wang et al, "Shared Book Reading", 16 pages.

Final Office Action for U.S. Appl. No. 12/732,103, mailed on Aug. 23, 2012, Marianna Wickman, et al., "Parent-Controlled Episodic Content on a Child Telecommunication Device", 13 pages.

Non-Final Office Action for U.S. Appl. No. 12/731,698, mailed on Aug. 30, 2012, Michael Kemery et al., "Chore and Rewards Tracker", 7 pages.

Final Office Action for U.S. Appl. No. 12/544,404, mailed on Oct. 19, 2012, Winston Wang et al, "Shareable Applications on Telecommunications Devices", 7 pages.

Office action for U.S. Appl. No. 12/544,881, mailed on Sep. 6, 2011, Kemery et al., "Parent Telecommunication Device Configuration of Activity-Based Child Telecommunication Device", 15 pages.

PCT Search Report and Written Opinion mailed Jun. 27, 2011 for PCT Application No. PCT/US10/45996.

Office Action for U.S. Appl. No. 12/732,103, mailed on Sep. 19, 2013, Wickman et al., "Parent-Controlled Episodic Content on a Child Telecommunication Device", 16 pages.

Office Action for U.S. Appl. No. 12/731,717, mailed on Sep. 23, 2013, Wang et al., "Shared Book Reading", 17 pages.

Office Action for U.S. Appl. No. 12/544,881, mailed on Sep. 30, 2013, Michael Kemery, "Parent Telecommunication Device Configuration of Activity-Based Child Telecommunication Device", 19 pages.

Final Office Action for U.S. Appl. No. 12/731,698, mailed on Jan. 23, 2013, Michael Kemery et al., "Chore and Rewards Tracker", 8 pages.

Final Office Action for U.S. Appl. No. 12/731,717, mailed on Feb. 6, 2014, Winston Wang et al, "Shared Book Reading", 17 pages.

* cited by examiner

LICENSED CONTENT PURCHASING AND DELIVERING

BACKGROUND

Advances in technology have made possible the storage and transmission of large media objects, applications, and other forms of content. Songs, movies, television shows, video clips, pictures, and video games are widely available, sold through the Internet and distributed on computer-readable media. A typical user possesses several devices—including telecommunications devices such as mobile phones—that are used to acquire, store, and play those many forms of content.

To acquire content, users often interact with online merchants who enable purchasing and downloading of the content. The online merchants have web sites that users can browse. The web sites often include logic that enables a user to select a content item, enter payment information, and begin downloading the item. Usually, the content item is downloaded onto the device that the user utilized to browse the web site and purchase the content item. Before downloading can begin, the user may also be required to assent to a license agreement that restricts the usage rights acquired by the user when purchasing the content item.

Online merchants typically do not offer users any options other than buying content for themselves. Buying content that can be shared with other users or gifted to other users is often prohibited both by the capabilities of the recipients' devices and by the need for the recipients to give assent to the license agreement.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
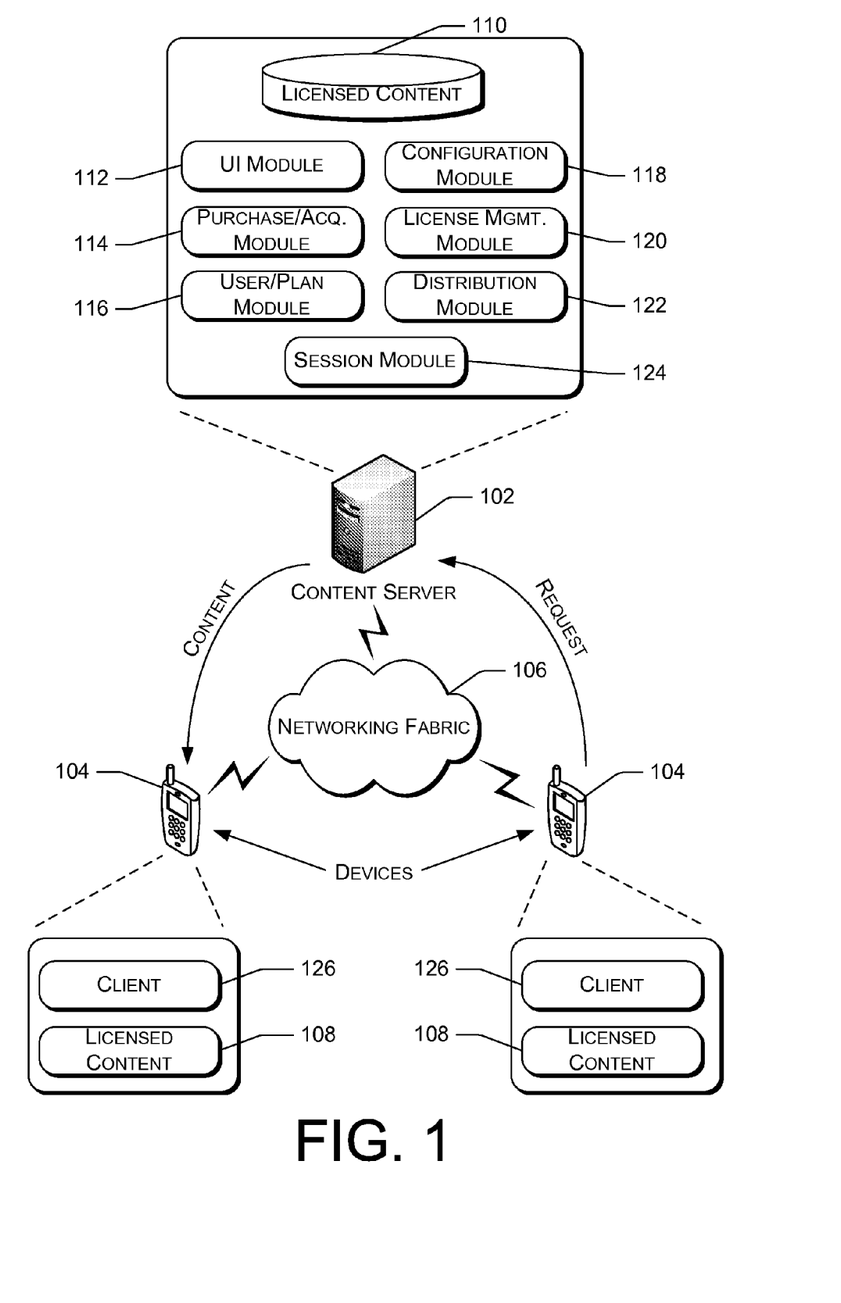
FIG. 1 is a block diagram of a content server and telecommunications devices connected to the content server, one telecommunications device purchasing content from the content server on behalf of another.

FIG. 1 shows a content server and telecommunications devices connected to the content server, in a configuration where a user of one telecommunications device purchases or acquires content from the content server on behalf of the user of the other telecommunications device. As illustrated, a content server 102 is communicatively coupled to a plurality of telecommunications devices 104 by a networking fabric 106. A first of the telecommunications devices 104 (in this example, a mobile phone) sends a request to the content server 102 for purchase or acquisition of licensed content 108. The request specifies at least a second telecommunications device 104 (in this example, a mobile phone) as the recipient of the licensed content 108. The content server 102 then processes the request and automatically delivers the licensed content 108 to the second of the telecommunications devices 104.

As is also shown, the content server 102 includes a number of components and modules. In one implementation, the content server 102 includes a licensed content database 110, a user interface (UI) module 112, a purchase/acquisition module 114, a user/plan module 116, a configuration module 118, a license management module 120, a distribution module 122 and a session module 124. Additionally, in some implementations, one or more of the telecommunications devices includes a client 126 that is configured to receive and utilize the licensed content 108.

Figure 4:
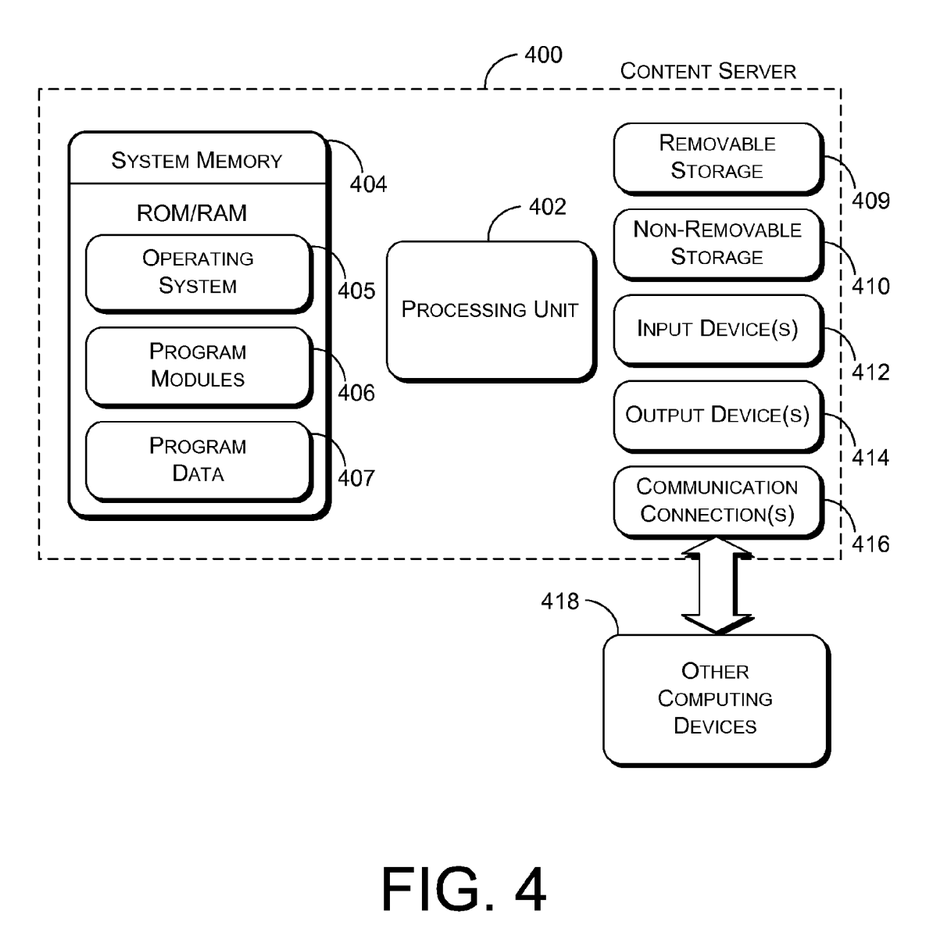
FIG. 4 is a block diagram showing common components of a server such as might be used to implement the content server described herein.

In various implementations, the content server 102 may be any sort of computing device known in the art equipped with modules and components 110-124. The content server 102 may be a personal computer (PC), a laptop computer, a workstation, a server system, a mainframe, a telecommunications device, a personal digital assistant (PDA), a set-top box, or any other computing device known in the art. In other implementations (not shown), the content server 102 represents a plurality of computing devices each implementing some portion of the functionality represented by modules and components 110-124. For example, content server 102 could include a database server storing the licensed content database 110 and a web server storing the UI module 112 and purchase/acquisition module 114, as well as other devices. In some implementations, content server 102 may be a virtual machine implemented on one or more computing devices. Additional hardware and software components of the content server 102 are illustrated in FIG. 4 and described in greater detail below with reference to that figure.

The telecommunications devices 104 that communicate with the content server 102 may also be any sort of computing device known in the art. For example, the telecommunications devices 104 may be telecommunications devices such as mobile phones or PDAs, landline phones, Internet phones, or may be media players, PCs, laptops, netbooks, reading devices or any sort of mobile or stationary computing device. As mentioned above, each telecommunications device 104 may have one or both of licensed content 108 and/or the client 126. In one implementation, however, one of the telecommunications devices 104 has neither the licensed content 108 nor the client 126. Such a telecommunications device 104 may be only an initiator of a content delivery to another telecommunications device 104, as is described further below. An example telecommunications device 104 is illustrated in greater detail by FIG. 5 and is described further below.

As is shown in FIG. 1, the telecommunications devices 104 and content server 102 are connected to a networking fabric 106 and communicate with each other through the networking fabric 106. The networking fabric 106 represents any one or more networks known in the art, such as cellular networks and/or data networks, including wide area networks (WANs), local area networks (LANs), personal area networks (PANs), and/or the Internet. For example, telecommunications devices 104 could be connected to both cellular and data networks and the content server could be connected exclusively to data networks. A connection between one of the telecommunications devices 104 and the content server 102 may be through a number or routers, base stations, and/or telecommunications devices acting as bridges between cellular and data networks. Communications between the content server 102 and telecommunications devices 104 utilize any sort of communication protocol known in the art for sending and receiving messages, such as the Transmission Control Protocol/Internet Protocol (TCP/IP) and/or the Hypertext Transfer Protocol (HTTP).

In some implementations, the licensed content 108 that is purchased/acquired and distributed includes one or more of application(s), video(s), audio file(s), picture(s), and/or electronic book(s). Additionally, the licensed content 108 could be shareable between users of multiple telecommunications devices 104, using such methods as described in U.S. patent application Ser. No. 12/544,404, which was filed on Aug. 20, 2009 and is entitled "Shareables". For instance, the licensed content 108 may be an executable application that enables a user to perform a creative activity (e.g. draw a picture) and share the results of that activity with another user of a different telecommunications device to collaborate on the creative activity with the originating user. Also, the licensed content 108 could be configurable, allowing the purchasing/acquiring user to provide restrictions on the features offered by the licensed content 108 to the receiving user. If the licensed content 108 is an email application, for example, the application could include configurable parameters, such as a list of permissible email addressees to which the application user could send emails.

In various implementations, the licensed content 108 is associated with a license. The license can restrict the licensed content 108 to be used by a single user or allow the licensed content 108 to be shared by a specified or unspecified group of users. The license can restrict the licensed content 108 to a set period of time. The license may relate to a collection or library of licensed content items in which licensed user(s) are limited to acquire a maximum number of items of licensed content during a set period of time. In one implementation, the license is applied to the licensed content 108 through digital rights management (DRM) technologies, such as those known in the art. DRM technology might require, for example, a recipient of a delivered installation to assent to a license agreement before the recipient is allowed to utilize the licensed content 108. The license for the licensed content 108 is managed by a license management module 120 of the content server 102, which is described below in further detail.

In various implementations, the licensed content 108 is stored in a licensed content database 110 (hereinafter "database 110"). The database 110 can be stored on the content server 102 or on another device communicatively coupled to the content server 102 (not shown). The database 110 can be any sort of database known in the art, such as a relational database, a structured database, an unstructured database, or an unstructured file. In addition to storing the licensed content 108, the database 110 also stores information about the licensed content 108 such as, for example, a price for the licensed content 108, a type classification of the licensed content 108 (e.g., "movie", "song", "application", "book", etc.), a title of the licensed content 108, an artist associated with the licensed content 108, and/or a duration associated with the licensed content 108.

In some implementations, the content server 102 makes available the licensed content 108 stored in database 110 through a UI module 112. The UI module 112 is made available to users through a web site or a user interface similar to a web site. Telecommunications devices 104 of those users establish connections to content server 102 and receive a user interface from the UI module 112 of the content server 102 in return. The user interface can be similar to a user interface of an online merchant, enabling users to browse licensed content by category, artist, etc. or allowing users to search for a specific title. The user interface can also provide users with any mechanism known in the art for locating licensed content 108 and learning information about that licensed content 108.

In one implementation, the UI module 112 requires the user to login or automatically recognizes the user based on information provided by the user's telecommunications device 104 in establishing the connection with the content server 102. The provided information or entered login information is then provided to a user/plan module 116 of the content server 102 to determine whether the user is a known user. In some implementations, login information may consist of a unique identifier associated with the telecommunications device 104 that is accessing the UI module 112. The identifier may consist of, for example, a phone number, a telecommunications device identifier, a subscriber identifier (such as an International Mobile Subscriber Identifier or IMSI), or any other identifier known to user/plan module 116. User/plan module 116 may store a record of known users in a database, or may poll an external database, such as, in GSM embodiments, a Home Location Register or HLR, to determine whether the user is authorized to purchase/acquire licensed content. In some implementations, user/plan module 116 may additionally poll an external database to determine the parameters of the user's authorization to purchase/acquire licensed content. For instance, if a user has purchased a licensed content plan allowing the user to purchase/acquire up to five items of licensed content during a billing cycle, the external database will return such parameter information to the user/plan module 116 which will, in turn, authorize the user to purchase/acquire the licensed content if within the received parameters. If the user is known, the user is considered "logged in" and, in some implementations, default information associated with the user can be used to autopopulate forms, such a purchase request forms, thereby saving users the time associated with data entry. If the user is not known, the UI module 112 requires the user to register and enter information about himself or herself.

In some implementations, the UI module 112 further provides users with a mechanism for indicating a desire to purchase content and for entering the necessary information to complete the transaction. As used herein, "purchase" is intended to cover both per item purchases of licensed content 108—where payment is exchanged for the content—and acquisitions in which, for example, the licensed content 108 is free. As used herein, "acquire" means to acquire in any other scenario in which a user is authorized to acquire licensed content 108, including, for example, users who subscribe to a licensed content plan which may, for example, allow the user to acquire a set number of items of licensed content per month in exchange for a recurring monthly fee. "Purchasing/acquiring user" is intended to cover both users purchasing or acquiring the licensed content 108. For example, the user interface could allow users to add licensed content 108 to a shopping cart or similar data structure for storing content to be purchased. When the user is ready to purchase the content, the user interface presents the user with a form or some similar data entry mechanism to inquire as to the identity of the purchaser, the identity of the recipient, and payment information. For example, if the purchasing/acquiring user provides a name of a recipient, the UI module 112 may interact with the user/plan module 116 of the content server 102 to determine whether any known users match the recipient name. If matches are returned, they are provided to the purchasing/acquiring user for the user to select among. If no matches are returned or if none of the matches names the correct recipient, the user interface may enable the purchasing/acquiring user to provide more information about the recipient's telecommunications device, such as a phone number, IP address, or some other form of identification. That information is then provided by the UI module 112 to the user/plan module 116 to create a new user.

In addition to entering the above information, the user interface may further enable the purchasing/acquiring user to indicate the number of users that the licensed content 108 can be shared with if the content 108 is shareable. For example, if the licensed content 108 is a movie that can be played at the recipient and simultaneously streamed by the recipient to other users, the user interface can enable the purchasing/acquiring user to indicate the number of other users to whom the licensed content 108 can be streamed. The UI module 112 may then adjust the purchase price based on the indicated number. Such pricing information can be retrieved by the UI module 112 from the purchase/acquisition module 114, in some implementations. Also, in one implementation, the user interface enables the purchasing/acquiring user to indicate not only the number of users who can share in the licensed content 108, but also the identities of the users who can share the licensed content 108. Also, in another implementation, the user may establish the number of users with whom the licensed content 108 may be shared at the time of purchasing or subscribing to a licensed content sharing plan. For example, a wireless telecommunications carrier may offer a family plan that includes a mandatory or optional licensed content sharing feature entitling all users under the plan to acquire licensed content 108.

After the purchasing/acquiring user enters all of the necessary information, or is otherwise authorized under a preexisting licensed content sharing plan, the user interface enables the purchasing/acquiring user to submit a request for purchasing/acquiring the licensed content 108 by, for example, clicking on a button.

In addition to enabling the purchasing/acquisition of licensed content 108, the UI module 112 enables users to purchase content plans for a group of users. The content plans entitle the group of users to a number of items of licensed content 108 in a time period. As with purchasing/acquiring licensed content 108, purchase of a content plan asks the purchasing/acquiring user to complete a form with identifying information, payment information, and identifications of users who are to be among the group of users. In one implementation, the UI module 112 may vary the price for the content plan based on the number of items of licensed content 108 selected for the plan, the length of the time period in which the items are available, and/or the size of the group. The UI module 112 interacts with the purchase/acquisition module 114 to determine the updated price information based on such factors. After purchasing a content plan, the purchasing/acquiring user and/or other users in the group of users of the content plan can select items of licensed content 108 that they wish to receive in accordance with the content plan.

Once a purchase/acquisition request is submitted through the UI module 112, the purchase/acquisition module 114 is invoked to process the purchase/acquisition of the licensed content 108. The purchase/acquisition module 114 either processes the transaction itself or interacts with an external device to process the transaction. For example, the purchase/acquisition module 114 might interact, in a purchase implementation, with an external server to process the transaction if credit card information is provided by the purchasing/acquiring user. In addition to processing purchase requests, the purchase/acquisition module 114 may also be invoked to process purchases of content plans, either directly or through interaction with an external device. Also, the purchase/acquisition module 114 provides pricing information to the UI module 112, as described above, and updates prices of licensed content 108 and/or content plans based on a number of users party to the plan or using the content, or based on a number of items available through the plan or a time period during which the items are available. The purchase/acquisition module 114 can also take other factors into account in determining pricing.

As mentioned above, the content server 102 includes a user/plan module 116 to interact with the purchase/acquisition module 114 and UI module 112. In one implementation, the user/plan module 116 stores profiles of users and plans in, for example, a relational database and updates the profiles in response to the registration of new purchasing/acquiring users, the designation of new recipients, and/or the purchasing of new content plans. These updates are received from the UI module 112 and can be utilized by the purchase/acquisition module 114 to determine the price of licensed content 108 or of a content plan. In another implementation, the user/plan module 116 may be an external database, such as a Home Location Register or HLR, that stores user profiles and plans. The user/plan module 116 also tracks the items of licensed content 108 acquired in accordance with a content plan to determine whether additional items of licensed content 108 are still available under the terms of the plan and provides that information to the UI module 112 and purchase/acquisition module 114.

In various implementations, upon completion of the purchase/acquisition of licensed content 108 or upon selection of licensed content 108 under a content plan, a configuration module 118 of the content server 102 determines whether the purchased/acquired licensed content 108 is configurable. For example, the licensed content 108 may be an executable application with one or more features that can be disabled. In response to determining that the licensed content 108 is configurable, the configuration module 118 invokes the UI module 112 to provide the purchasing/acquiring user with the option of configuring the licensed content prior to its distribution. The UI module 112 can alert the user in any number of ways and allow the user to indicate whether or not the user wishes to configure the licensed content 108 by providing the user with, for instance, yes and no buttons. If the user indicates that configuration is desired, the UI module 112 then presents the user with a list of potential configurations determined by the configuration module 118. In one implementation, the configuration module 118 determines the configuration options by querying the licensed content database 110 to check whether the database 110 stores any information about potential configurations of the licensed content 108 and how to affect those configurations. The user then selects one or more of the potential configurations and sets a value associated with that configuration, such as "on" or "off". For example, if the licensed content 108 is a movie that includes both an original cut and a safe/edited version, the user may select between the versions. In response to the user setting a value, the configuration module 118 proceeds to affect the configuration by, for instance, disabling a feature or selecting among multiple versions. The configured version of the purchased/selected licensed content 108 is then available for distribution.

In some implementations, a license management module 120 of the content server 102 tracks the rights acquired in the licensed content 108, such as the number of users who can share the licensed content 108 and the number of users to whom the licensed content 108 is provided. The license management module 120 receives this information from the purchase/acquisition module 114 and/or the user/plan module 116 in response to request for any new purchases or acquisitions of licensed content 108. In response, the license management module 120 then invokes the UI module 112 to have the UI module 112 present the purchasing/acquiring user with a license agreement that must be assented to before the content is distributed. Upon receiving an indication of user assent, the license management module 120 informs the purchase/acquisition module 114 and/or user/plan module 116, allowing the transaction to proceed. The license management module 120 then informs the licensors or an agent of the licensors of the purchase of the licensed content through, for example, emails, reports, or invoices.

Once the licensed content 108 has been purchased/acquired and, optionally, configured, a distribution module 122 of the content server 102 automatically delivers the licensed content 108 to telecommunications device(s) 104 of the recipient(s). Installations include downloading of the licensed content 108 to a recipient telecommunications device 104 at the instigation of the content server rather than by request of the recipient telecommunications device. Prior to installation of the licensed content 108, the distribution module 122 determines whether the recipient telecommunications device 104 has been configured to receive installation of the licensed content 108. If not, the distribution module 122 installs a client 126 on the recipient telecommunications device 104 or provides other executable instructions having a similar function and purpose to that of the client 126. In other implementations, rather than installing the client 126 itself, the distribution module 122 invokes another device or module to perform the installation of the client 126.

In various implementations, once the distribution module 122 determines that the recipient telecommunications device 104 is configured to receive the licensed content 108 or once the distribution module 122 installs or causes the installation of the client 126, the distribution module 122 provides the licensed content 108 to the recipient telecommunications device 104.

In some implementations, the content server 102 can also facilitate a session between telecommunications devices 104 that is associated with the licensed content 108. The content server 102 includes a session module 124 that is known to the clients 126. The identity of the session module 124 can also or instead be provided with the licensed content 108. The clients 126 can then contact the session module 124 to request that the session module 124 establish a session between the telecommunications devices 104. The session can be a client-server session, with the session module 124 acting as a server to the clients 126 or with another device acting as a server to the clients 126. In other implementations, the session can be a peer-to-peer session with the session module 124 enabling the peer-to-peer session by providing the clients 126 with the necessary information to carry out the peer-to-peer session.

In various implementations, as shown in FIG. 1 and mentioned above, the telecommunications devices 104 include clients 126 or equivalent instructions that are installed by the content server 102 or by some other device. And as described above, the client 126 enables a telecommunications device 104 to receive content and engage in a session established by a session module 124 of the content server 102. In addition to these functionalities, the client 126 may also enable a user of the telecommunications device 104 to utilize the licensed content 108 by, for example, rendering the licensed content 108 (if the licensed content 108 is media such as a video or audio clip) or executing the licensed content 108 (if the licensed content 108 is an executable application). Before rendering or executing the licensed content 108, however, the client 126 may require the user to assent to a license agreement specified by DRM protections associated with the licensed content 108. The user may be required to assent since the user was not the purchaser of the licensed content 108 and did not assent at the time of purchase. Once the user has assented, DRM protections are at least partially deactivated and a notice is sent to the license management module 120 of the content server 102 and/or to the licensor.

In one implementation, rather than engaging the session module 124 of the content server 102 to establish a peer-to-peer session, the client 126 directly contacts another client 126 of another telecommunications device 104, the other telecommunications device 104 being known to the telecommunications device 104 (e.g., as a "friend" mentioned in a "friend list" of an application of the telecommunications device 104). The clients 126 then establish the peer-to-peer session in any manner known in the art. The type of the session and its features depend on the licensed content 108 associated with the session. For example, if the licensed content 108 is a movie, the session may involve coordinating the rendering of the movie on the telecommunications devices 104 so that the rendering is simultaneous.

In some implementations, the content server 102 is associated with a telecommunications service provider and the telecommunications devices 104 are telecommunications devices receiving telecommunications service from the telecommunications service provider. The telecommunications service provider may have configured the telecommunications devices to each have a client 126 when those devices were initially configured for their users or may instead provide the clients 126 through the content server 102, in the manner described above. In various implementations, the user interface provided by the UI module 112 of the content server 102 serves as a portal for the telecommunications service provider through which the provider can offer licensed content 108 and other content and services to telecommunications devices. In one implementation, a telecommunications device can establish a session associated with the licensed content 108 by calling another telecommunications device.

Figure 2:
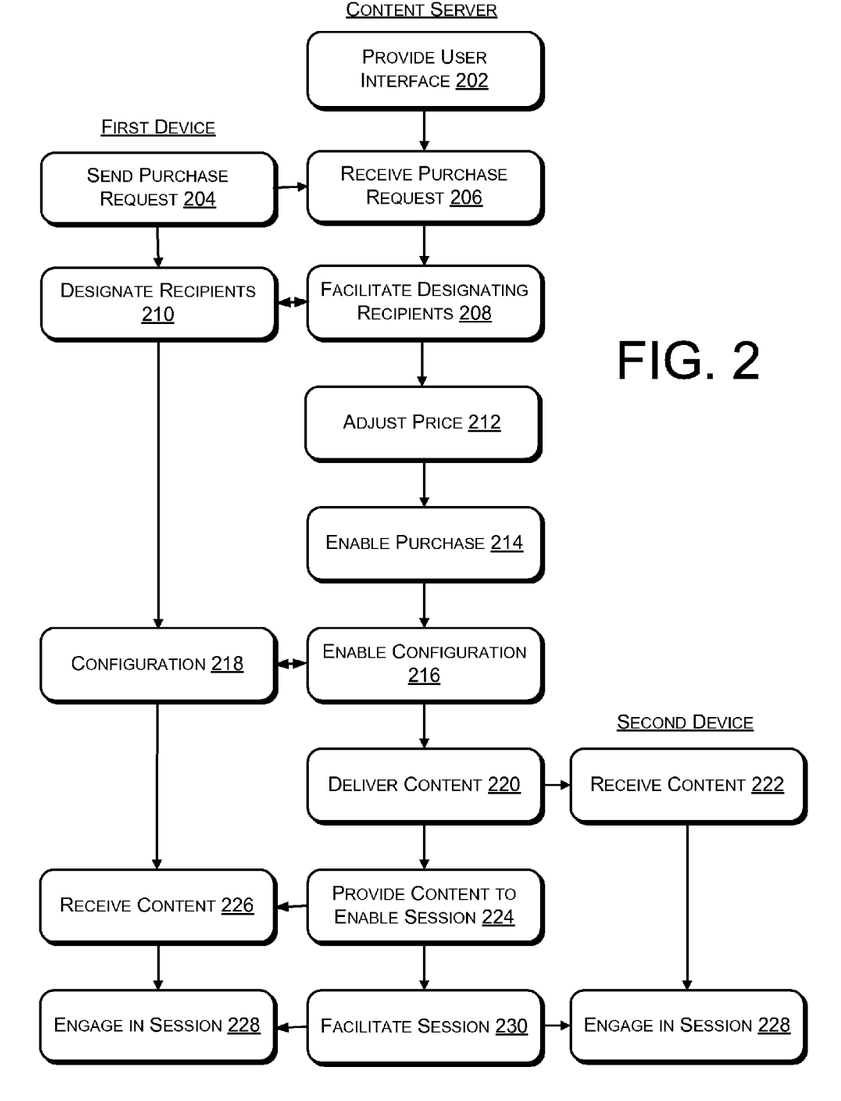
FIG. 2 is a flowchart showing a method of enabling a user of a first telecommunications device to purchase or acquire licensed content and delivering that content to a second telecommunications device.

FIG. 2 shows a flowchart of a method for enabling a user of a first telecommunications device to purchase licensed content and for delivering that content to a second telecommunications device. As illustrated, a content server 102 first provides a first user interacting with the content server 102 through a first telecommunications device 104 with a user interface, block 202. As discussed above, the user interface may enable browsing, search, and purchasing/acquiring of licensed content 108, as well as purchasing of content plans, entry of information, and configuration of licensed content 108.

In various implementations, the first user then utilizes the first telecommunications device 104 to send a request to purchase the licensed content 108, block 204. The purchase request can specify a second user to receive the licensed content 108, a second telecommunications device 104 of the second user, information associated with the first user, and/or payment information. The first user enters the information specified in the purchase request into the user interface provided by the content server 102. The content server 102 then receives the purchase request, block 206, and begins processing of the request.

As part of processing the purchase request, the content server 102 may facilitate the designation of recipient(s) of the licensed content, such as designating the second user, block 208. The content server 102 may facilitate the designation of recipients by providing a user interface, for example. The first user may then designate recipients by specifying them through the user interface, block 210. In other implementations, the purchase request may have designated a name, but not a telecommunications device 104 for a recipient. In such implementations, the content server 102 facilitates designation, block 208, by identifying telecommunications device(s) 104 associated with the named recipient. The first user then designates the recipient, block 210, by selecting the name and telecommunications device 104 intended as the recipient.

In some implementations, the content server 102 then adjusts the price of the licensed content 108 based on the number of recipients designated, block 212. The content server 102 may display this adjusted price to the first user and require the first user to confirm purchase at the adjusted price before proceeding.

In various implementations, the content server 102 then enables the purchase of the licensed content 108, block 214. The content server 102 may enable the purchase by processing a transaction associated with the purchase request or by interacting with another device to process the transaction.

After completing the purchase, the content server 102 then enables configuration of the licensed content 108 by the first user if the licensed content 108 is configurable, block 216. The content server 102 determines if the licensed content 108 is configurable and provides, via user interface, the configuration options for the licensed content 108 to the first user. The first user may then utilize the first telecommunications device 104 to configure the licensed content 108 by specifying settings for the available configurations, block 218. For example, the first user may elect to disable a feature of the licensed content 108 that is to be provided to the second user.

In some implementations, the content server 102 then automatically delivers the licensed content 108 to a second telecommunications device 104 of a second user, block 220, the second user having been designated as the recipient. In one implementation, prior to delivering the licensed content 108, the content server 102 configures the second telecommunications device 104 to receive and utilize the licensed content 108 by, for example, installing a client 126 on the second telecommunications device 104. The second telecommunications device 104 then receives and, if necessary, installs the licensed content 108, block 222.

In one implementation, if the licensed content is sharable and other recipients are designated, the content server 102 automatically delivers the licensed content 108 to telecommunications devices of the other recipients to enable the second user and other recipients to engage in a session associated with the licensed content 108, block 224. For instance, the content server could deliver the licensed content 108 to the first telecommunications device 104 to enable the first user of the first telecommunications device 104 to engage in a session associated with the licensed content. The first telecommunications device 104 then receives and, if necessary, installs the licensed content 108, block 226.

As illustrated, the first and second telecommunications devices 104 then engage in a session associated with the licensed content 108, block 228. The session could be peer-to-peer, with clients 126 of the first and second telecommunications devices 104 establishing a data connection, or could be client-server, with clients 126 of the first and second telecommunications devices 104 interacting with each other through connections between each and the content server 102 or another server. If the session is client-server, the content server may facilitate the session, block 230.

Figure 3:
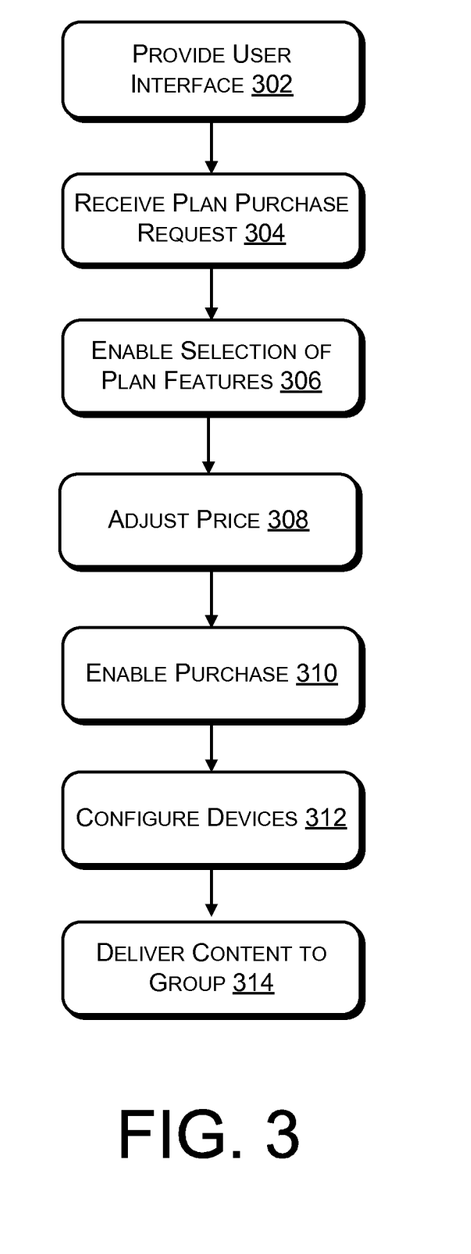
FIG. 3 is a flowchart showing a method of enabling the purchase of a content plan for a group of users and delivering content in accordance with the plan to the users.

FIG. 3 shows a flowchart of a method for enabling the purchase of a content plan for a group of users and delivering content in accordance with the plan to the users. As illustrated, a content server 102 first provides users interacting with the content server 102 with a user interface, block 302. As discussed above, the user interface may enable browsing, search, and purchasing/acquiring of licensed content 108, as well as purchasing of content plans, entry of information, and configuration of licensed content 108.

The content server 102 then receives a request to purchase a content plan, block 304. The request specifies a number of plan features, such as a number of licensed content items, a size of a group subject to the content plan, and/or a time period associated with the content plan. In some implementations, the content server 102 enables the user to select among these plan features and specify the features, block 306. The content server 102 can then adjust the price of the content plan based on the selected/specified features, if appropriate, block 308.

In various implementations, the content server 102 may then enable purchase of the content plan, block 310. The content server 102 may enable the purchase by processing the transaction or by interacting with another device to process the transaction. The content server 102 may then further enable the user to select items of licensed content 108 in accordance with the content plan.

Before delivering licensed content selected in accordance with the content plan, however, the content server 102 configures the telecommunications devices 104 of the group of users subject to the content plan to receive and utilize the licensed content, block 312. In one implementation, the configuring includes installing a client 126 on the telecommunications devices 104 of the group of users.

In various implementations, the content server 102 then delivers the selected licensed content 108 to the telecommunications devices 104 of some or all of the group of users to enable shared consumption of the licensed content 108 in accordance with terms of the content plan, block 314.

FIG. 4 shows an exemplary computing device 400 such as may be used as the content server 102. In various embodiments, computing device 400 may include at least one processing unit 402 and system memory 404. Depending on the exact configuration and type of computing device, system memory 404 may be volatile (such as RAM), non-volatile (such as ROM, flash memory, etc.) or some combination of the two. System memory 404 may include an operating system 405, one or more program modules 406, and may include program data 407.

Computing device 400 may also include additional data storage devices (removable and/or non-removable) such as, for example, magnetic disks, optical disks, or tape. Such additional storage is illustrated in FIG. 4 by removable storage 409 and non-removable storage 410. Computer storage media may include volatile and nonvolatile, removable and non-removable media implemented in any method or technology for storage of information, such as computer readable instructions, data structures, program modules, or other data. System memory 404, removable storage 409 and non-removable storage 410 are all examples of computer-readable storage media. Computer-readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer-readable storage media may be part of device 400.

In various embodiment, any or all of system memory 404, removable storage 409, and non-removable storage 410, may store programming instructions which, when executed, implement some or all of the above-described operations of the content server 102.

Computing device 400 may also have input device(s) 412 such as a keyboard, a mouse, a touch-sensitive display, voice input device, etc. Output device(s) 414 such as a display, speakers, a printer, etc. may also be included. These devices are well know in the art and need not be discussed at length here.

Computing device 400 may also contain communication connections 416 that allow the device to communicate with other computing devices 418.

Figure 5:
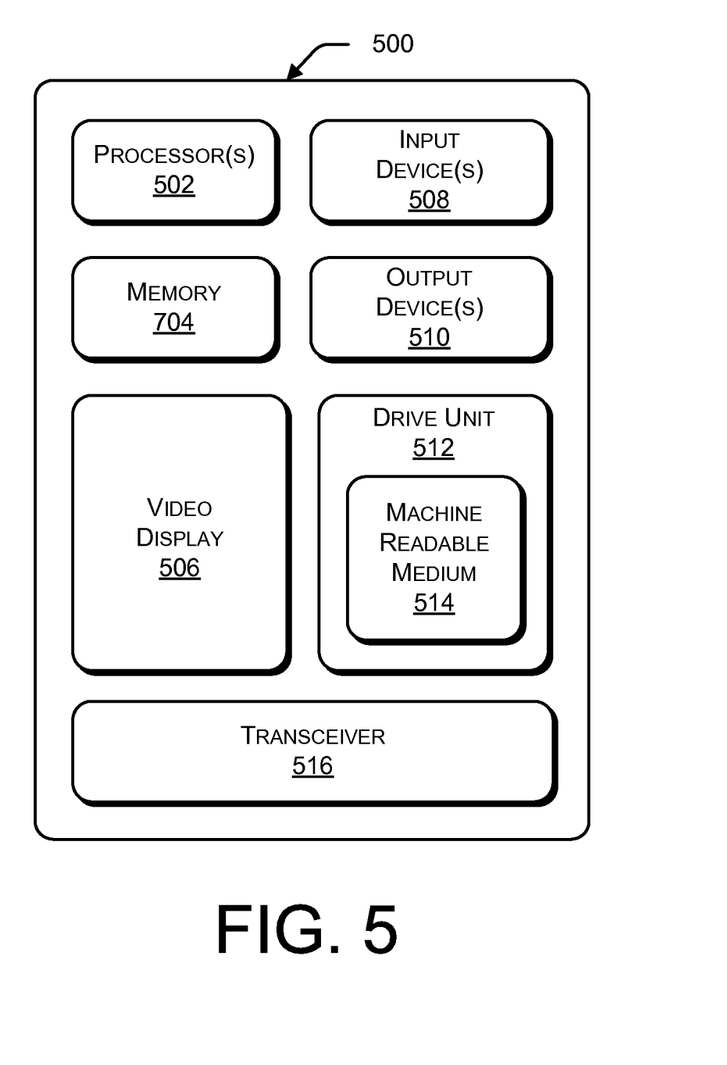
FIG. 5 is a block diagram showing common components of a telecommunications device such as might be used to implement the first or the second telecommunications device described herein.

FIG. 5 shows an exemplary telecommunication device 500 such as may be used as one of the telecommunications devices 104. Telecommunication device 500 comprises one or more processors 502, a memory 504, a video display 506, one or more input devices 508, one or more output devices 510, a drive unit 512 which can access a machine readable medium 514, and a transceiver 516. The machine readable medium 514 stores one or more sets of instructions (e.g., software) embodying any one or more of the methodologies or functions described herein. The instructions may also reside, completely or at least partially, within the memory 504 and within the processor 502 during execution thereof by the telecommunication device 500. The memory 504 and the processor 502 also may constitute machine-readable media.

The input device 508 may be a keyboard, keypad, touch screen, or microphone. Other input devices 508 may be used. The video display 506 may be a liquid crystal display (LCD), a flat panel, a solid state display or other device. The processor 502 may be a central processing unit (CPU), a graphics processing unit (GPU), or both CPU and GPU, or other processing unit or component.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

I claim:

1. A method comprising:
enabling, by a content server, a purchase of licensed content by a first user of a first device for a second user of a second device, wherein the enabling includes enabling the first user to adjust a purchase price based on a total number of users covered by one or more licenses to the shareable, licensed content, a number of users allowed by the one or more licenses to consume the shareable, licensed content, and a number of users allowed by the one or more licenses to share the shareable, licensed content; and
automatically delivering, by the content server, the licensed content to the second device to enable consumption of the licensed content by the second user of the second device.

2. The method of claim 1, further comprising receiving a request from the first user of the first device to purchase the licensed content.

3. The method of claim 1, wherein the first and second devices are telecommunications devices and the content server is associated with a telecommunications service provider.

4. The method of claim 1, wherein the licensed content includes one or more of application(s), video(s), audio file(s), picture(s), and/or electronic book(s).

5. The method of claim 1, further comprising providing the licensed content to both the first and second devices to enable the first and second devices to engage in a session for shared consumption of the licensed content.

6. The method of claim 5, wherein the license allows shared consumption between two or more devices.

7. The method of claim 1, further comprising providing a graphic user interface to facilitate users in selecting licensed content to purchase and/or in configuring purchased licensed content.

8. A system comprising:
a processor;
memory coupled to the processor and storing executable instructions that are configured to be operated by the processor to perform operations including:
enabling a purchase of sharable, licensed content by a first user of a first device for one or more second users of one or more second devices, including enabling the first user to adjust a purchase price based on a total number of users covered by one or more licenses to the shareable, licensed content, a number of users allowed by the one or more licenses to consume the shareable, licensed content, and a number of users allowed by the one or more licenses to share the shareable, licensed content; and
automatically delivering the sharable, licensed content to the second device to enable the second user to share the sharable, licensed content by engaging in a session associated with the sharable, licensed content between the second device and other device(s).

9. The system of claim 8, wherein the sharable, licensed content includes one or more of application(s), video(s), audio file(s), picture(s), and/or electronic book(s).

10. The system of claim 8, wherein the operations further include enabling the first user of the first device to configure the sharable, licensed content for the second users of the second devices, the configuring including restricting use of one or more features of the sharable, licensed content.

11. The system of claim 8, wherein the operations further include providing a graphic user interface to facilitate users in selecting sharable, licensed content to purchase and/or in configuring purchased sharable, licensed content.

12. The system of claim 8, wherein the operations further include facilitating an acquiring user in designating users that are parties to the licenses for the sharable, licensed content.

13. The system of claim 8, wherein the session is peer-to-peer, with clients of the first and second devices establishing a data connection, or is client-server, with clients of the first and second devices interacting with each other through connections between each and the content server or another server.

14. One or more non-transitory computer-readable storage media comprising computer-executable instructions stored on the computer-readable storage media and configured to program a content server to perform operations including:
enabling a purchase of licensed content by a first user of a first device for a second user of a second device, wherein the enabling includes enabling the first user to adjust a purchase price based on a total number of users covered by one or more licenses to the shareable, licensed content, a number of users allowed by the one or more licenses to consume the shareable, licensed content, and a number of users allowed by the one or more licenses to share the shareable, licensed content; and automatically delivering the licensed content to the second device to enable consumption of the licensed content by the second user of the second device.

15. The one or more computer-readable storage media of claim 14, further comprising providing the licensed content to both the first and second devices to enable the first and second devices to engage in a session for shared consumption of the licensed content.

16. The one or more computer-readable storage media of claim 14, wherein the license terms allow shared consumption between two or more devices.

17. The one or more computer-readable storage media of claim 14, further comprising providing a graphic user interface to facilitate users in selecting licensed content to purchase and/or in configuring purchased licensed content.

18. The one or more computer-readable storage media of claim 14, further comprising enabling the first user of the first device to configure the licensed content for the second user of the second device, the configuring including restricting use of one or more features offered by the licensed content by modifying one or more configurable parameters of the licensed content.

19. The method of claim 1, further comprising enabling, by the content server, the first user of the first device to configure the licensed content for the second user of the second device, the configuring includes restricting use of one or more features offered by the licensed content by modifying one or more configurable parameters of the licensed content.

* * * * *